United States Patent [19]

Bruke

[11] Patent Number: 4,984,477
[45] Date of Patent: Jan. 15, 1991

[54] DRIVING DEVICE

[75] Inventor: Richard Bruke, Bunkeflostrand, Sweden

[73] Assignee: Spirac Engineering AB, Malmo, Sweden

[21] Appl. No.: 316,290

[22] Filed: Feb. 27, 1989

[30] Foreign Application Priority Data

Feb. 29, 1988 [SE] Sweden ................. 8800702

[51] Int. Cl.$^5$ ............................................. F16H 25/24
[52] U.S. Cl. ................................ 74/89.15; 74/424.8 R
[58] Field of Search ............. 74/89.15, 99 A, 424.8 R

[56] References Cited

U.S. PATENT DOCUMENTS

| | | | |
|---|---|---|---|
| 427,473 | 5/1890 | Hauck, Jr. | 74/89.15 |
| 977,288 | 11/1910 | Euchenhofer | 74/99 A X |
| 1,194,901 | 8/1916 | Truman | 74/89.15 |
| 1,470,687 | 10/1923 | Clarke | 74/89.15 X |
| 1,960,089 | 5/1934 | Rabb | 74/89.15 |
| 2,791,909 | 5/1957 | Rick | 74/89.15 |
| 2,936,646 | 5/1960 | Gould | 74/424.8 R X |
| 2,989,198 | 6/1961 | Bradley | 74/99 A X |
| 3,363,434 | 1/1968 | Kuhn et al. | 74/89.15 X |
| 3,599,499 | 8/1971 | Steiner | 74/89.15 |
| 3,606,801 | 9/1971 | Williams | 74/424.8 R |

*Primary Examiner*—Allan D. Herrmann
*Attorney, Agent, or Firm*—Julian H. Cohen

[57] ABSTRACT

A driving device for producing substantially linear movement of a driver comprises a shaftless spiral rotatable around its longitudinal axis. The spiral encloses at least one sliding body which is provided with at least one element projecting from the sliding body which passes between two adjoining turns of the spiral. The sliding body co-operates with an element secured against rotational movement which prevents the sliding body from rotating with the spiral. An elongated element oriented in the axial direction of the spiral is connected at one end to the sliding body and at its other end to the element which is secured against rotational movement to form the driver. Upon rotation of the spiral, the sliding body and thereby the driver are moved in the axial direction of the spiral for moving the element secured against rotational movement.

15 Claims, 3 Drawing Sheets

DRIVING DEVICE

FIELD OF THE INVENTION

The present invention relates to a driving device for producing substantially linear movement of a driver.

DESCRIPTION OF PRIOR ART

A need exists in many technical applications for a driving device intended to act upon a body so as to move it along a predetermined path which in many cases is mainly linear. In certain applications the movement takes place at the same time as the body describes a turning, or possibly a rotational, movement at least during a part of its movement along the path. Frequently, demands are made for a rapid movement and many times it is desired that the driving device should function reliably under severe environmental conditions, e.g. in, or under, water or in an environment where dirt and particles have a disturbing effect, such as a corrosive or abrasive effect on the driving device.

To meet the abovementioned needs it is known to use e.g. linear motors, hydraulic components (cylinders and pistons), articulated couplings, screw rods, etc.

Electromechanical devices which usually consist of a rotating threaded spindle axis along which a torsionally rigid "nut" acts as a driver for the linear movement, offer only limited stroke lengths, since the spindle axis is merely supported at its two ends. Such devices are also easily affected when installed in environments where e.g. solid particles and dirt deposit on the threads of the spindle axis and in such environments said devices as a rule present unsatisfactory operational reliability.

The abovementioned technique, as a rule, is space-demanding, solves problems only within limited technical areas and demands, especially in cases of extended paths of motion, that the structures should be mechanically stable. This stability is difficult to achieve with the driving devices previously known and referred to above unless they are given larger dimensions than those demanded by the force or power actually required. Automatics for pneumatic and hydraulic equipments too are expensive. Consequently the known techniques involve considerable costs.

SUMMARY OF THE INVENTION

The present invention seeks to a driving device of a particularly simple construction where the aforementioned needs are met at the same time as the problems indicated are solved. The invention is usable in a multitude of applications where a need exists for moving a body along a predetermined path.

In a preferred embodiment of the invention a spiral is surrounded by an elongated casing of a substantially circular inner cross-section. This embodiment is particularly appropriate for use in cases of great stroke lengths, since it makes it possible to allow the spiral to be in touch with the casing essentially along the whole length of the casing. The supporting function of the casing makes possible great stroke lengths combined with simple and light constructions and moreover, permits rapid movements. The constructional features of the device also imply such wide tolerances that surrounding liquids, intruding particles or dirt do not interfere with the function of the device.

BRIEF DESCRIPTION OF THE FIGURES OF THE DRAWINGS

The invention will be described below in more detail in connection with a number of figures, where.

DETAILED OF PREFERRED EMBODIMENTS

Figure 1:
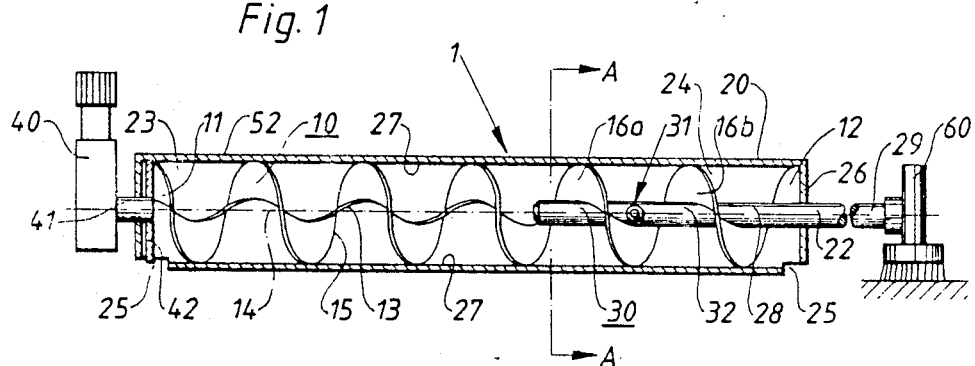
FIG. 1 is a side view, in section, of a first embodiment of the driving device.

In the embodiments of the invention shown in the figures will be found a driving device 1 comprising a shaftless spiral 10 with a first end region 11 and a second end region 12. Two spiral turns located adjoining one another have the reference numerals 16a,16b. In the embodiments shown, the first end region constitutes the driving end of the spiral wherein the spiral is connected via a clutch 42 to a driving shaft 41 which in turn is coupled to a motor 40. The spiral 10 is provided with a generally rounded limiting surface 13 facing towards its geometrical center axis 14. The outer limiting surface of the spiral has the reference numeral 15. In general the spiral is wound from a flat plate which is dimensioned so that it is largely dimensionally stable in its longitudinal direction. In some applications, by contrast, the spiral is adapted so that a certain amount of deformation transversely to its axial direction is permitted.

Figure 7:
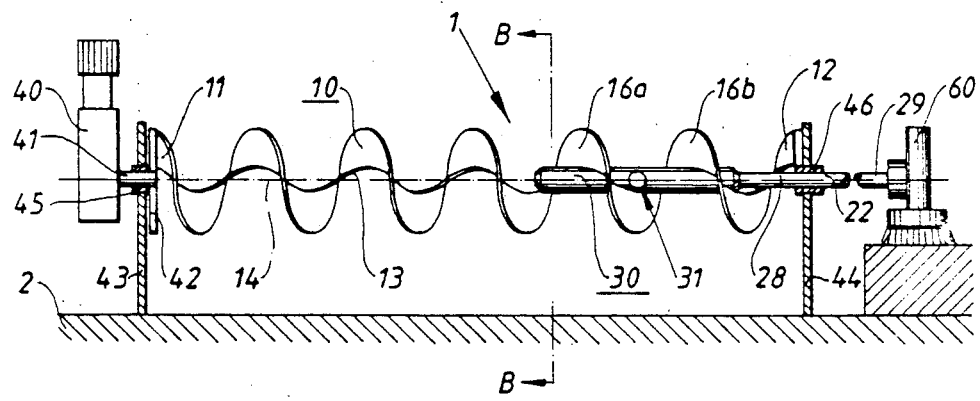
FIG. 7 is a side view, in section, of a further embodiment of the driving device

In FIG. 1 and FIG. 7 the spiral 10 is shown in embodiments of the invention wherein the spiral has a substantially uniform pitch along its length. In accordance with the invention the spiral in certain embodiments is adapted so that its pitch is different in different parts of the spiral. It is here a matter of the spiral in certain embodiments being "lefthand" in some parts and "righthand" in other parts.

In FIG. 1 is shown an embodiment where the spiral is surrounded at least partly by a limiting means 20 which is formed by a casing 20 of a substantially circular cross-section. The casing forms a wall 52 with an inner limiting surface 27 facing towards the spiral and has a first end region 23 and a second end region 24, the positions of which largely correspond to the first end region 11 and the second end region 12 respectively of the spiral. The casing as a rule is provided with openings 25 to which on rotation of the spiral any contaminations, e.g. particles or bodies which have entered into the cavity of the casing, are transferred and through which openings said contaminations are removed from the cavity. In certain applications the casing is closed off next to its second end region by an end wall 26 which as a rule is arranged substantially perpendicular to the axial direction of the casing. In certain embodiments the casing is provided with one or more grooves or slots 21a–e (see FIG. 2, 3 and 5a–c) which extend in the longitudinal direction of the casing. In some applications the slots are mainly straight whilst in other applications at least some of them are curved.

Figure 5A:
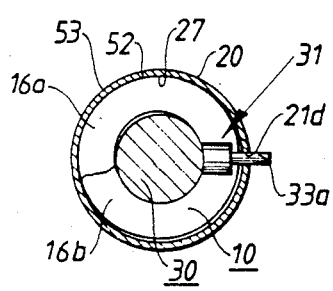
FIGS. 5a–e are section taken along line A—A in FIG. 1 for different embodiments of of the driving device.
Figure 5B:
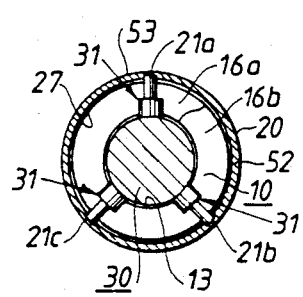
Figure 5C:
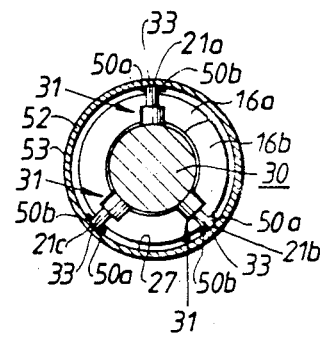
Figure 5D:
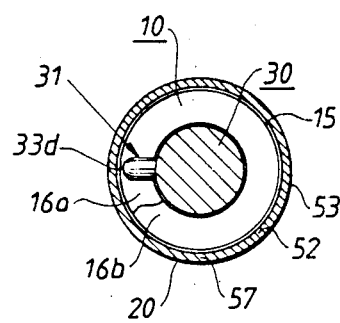
Figure 5E:
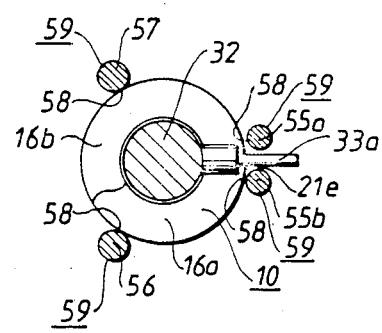

In FIG. 5e the driving device is shown in an alternative embodiment where the limiting means 59 for the spiral is formed by four bars 55a,b, 56, 57 distributed in the circumferential direction of the spiral and oriented substantially in the longitudinal direction of the spiral. Two of the bars 55a,b are located close to one another and form between them a gap 21e located in the longitudinal direction of the spiral. For the rest the bars have a mutual orientation and location which implies that they enclose the spiral 10 with little play. It is obvious that in certain embodiments more than one gap is provided in the circumferential direction of the spiral and/or more than four bars are included in the limiting means formed by the bars.

The surface of the bars facing towards the spiral has the reference numeral 58. In a simplified embodiment the limiting means is formed by only three bars distributed around the circumference of the spiral.

FIG. 1 also illustrates a sliding body 30 enclosed by the spiral 10. The sliding body has a central part 32 provided with a projecting element 31 which passes between two spiral turns 16a, 16b adjoining one another. The sliding body is provided with an elongated element 22 which projects from the sliding body in the axial direction of the central part 32 of the sliding body. The elongated element 22 has an orientation, at least in its region 28 closest to the central part, which substantially agrees with the axial direction of the central part 32. The elongated element 22 in its outer part 29, that is to say in the region farthest removed from the central part of the sliding body, is adapted as a driver 29 which co-operates with an external means 60. Depending on usage, the outer part 29 is attached rigidly or movably to the external means 60.

Figure 2:
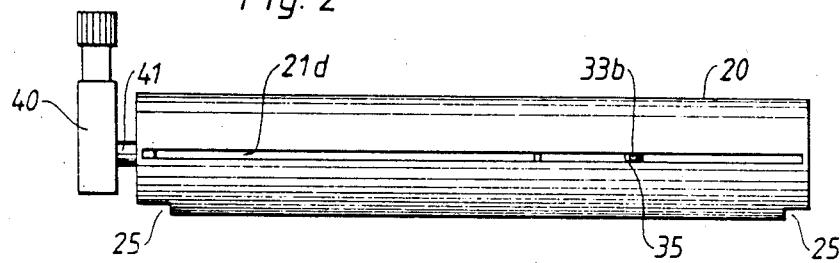
FIG. 2 shows the driving device provided with a slot and seen from the side.
Figure 3:
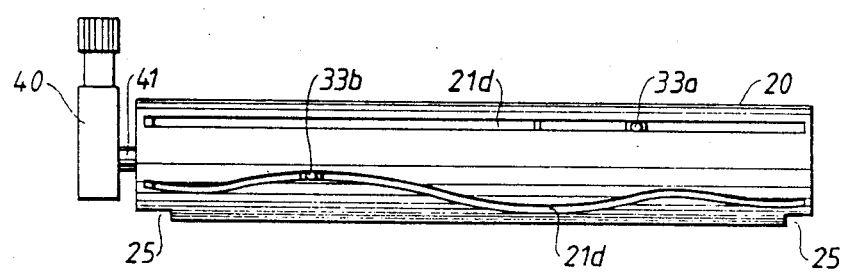
FIG. 3 shows the driving device with two slots seen from the side.

In FIG. 2 and FIG. 3 embodiments are shown where the slots are in the form of through-slots 21d in the wall of the casing 20 and located in the longitudinal direction of the same. In FIG. 3 is shown how one (21d) of the slots forms a curved line. Even though FIG. 2 and FIG. 3 show embodiments where the slots are designed as through-slots, it will be obvious to those versed in the art that also in applications where the slots (corresponding to what is shown in FIG. 5b-c) are constituted of recesses in the inner limiting surface 27 of the casing, or where each slot is formed by means of two elevations (50a,50b), the slot or slots in some embodiments are located in a manner corresponding to that shown in FIG. 2 and FIG. 3.

Figure 4A:
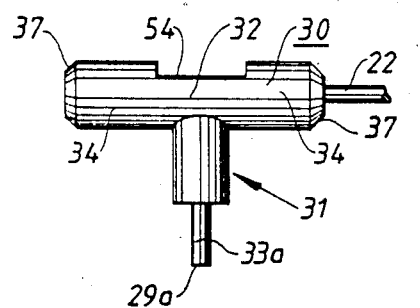
FIGS. 4a–d show embodiments of a sliding body forming part of the driving device.
Figure 4B:
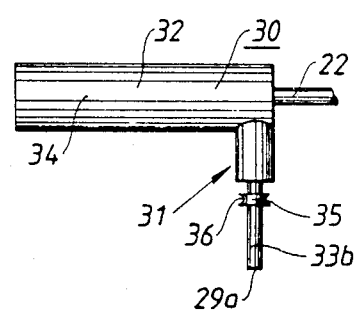
Figure 4C:
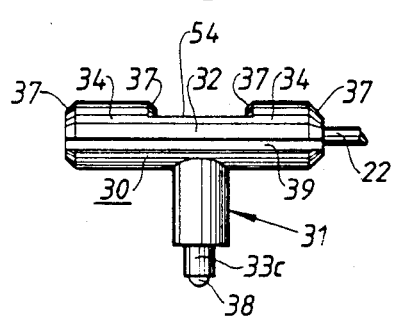

In FIGS. 4a-d are illustrated different embodiments of a sliding body 30. Its central part 32 is dimensioned so as to be enclosed by the spiral 10 whilst the projecting element 31 is dimensioned to pass between two spiral turns 16a, 16b of the spiral 10 adjoining one another. The central part 32 of the sliding body is provided with one or more substantially cylindrical portions 34 which co-operate with the limiting surface 13 of the spiral 10 directed towards the geometrical axis of the spiral for guiding the sliding body. In FIG. 4a is shown an embodiment where the cylindrical portions 34 are separated from one another in the longitudinal direction of the sliding body 30 by a recess 54 in the central part 32 whilst FIG. 4c shows an embodiment where the cylindrical portions are separated from one another by means of a longitudinal groove 39 also in the circumferential direction of the central part 32 of the sliding body.

In applications where the separation in the circumferential direction is necessary, there is generally no need for the cylindrical portions 34 to be separated also in the longitudinal direction of the central part 32. The central part 43 in many cases is provided with bevels 37 so as to facilitate the guiding of the sliding body when it travels inside the shaftless spiral 10. Thanks to the bevels a safe guidance of the sliding body, which is independent of contaminations, is achieved. Bevels are appropriate also when the limiting surface 13 of the spiral directed towards the geometrical center axis is not rounded. The length of the central part 32 is so chosen that the same and consequently also the cylindrical portions 34, are enclosed at least by substantially one whole turn of the spiral 10. In this manner the sliding body is assured of the necessary axial orientation during displacements in the axial direction of the spiral. The bevels 37 of the sliding body provided in certain embodiments are particularly appropriate for use when the inner limiting surface 13 of the spiral is not rounded.

In order that the sliding body during its travel inside the spiral should not "capsize", the radius of the cylindrical portions 34 is chosen so that the spiral 10 encloses the central part 32 with relatively little play. In a preferred embodiment the extension of the projecting element 31 in the longitudinal direction of the central body is adapted to the distance between two spiral turns 16a, 16b adjoining one another, so that the extension substantially corresponds to the distance between the spiral turns. As a result the projecting element passes with little play between the spiral turns, thus assuring a good control of the movement of the sliding body and backlash is prevented e.g. at a change of the rotational direction of the spiral.

In FIGS. 4a, 4b embodiments of the sliding body 30 are shown where the outer part 33a and 33b, respectively, of the projecting element 31 is particularly suitable to co-operate with a slot 21d designed as a slit (see FIG. 5). The outer part is of a length such that it projects through the slit which means that the outer part may be used e.g. as a supplementary driver or as a position indicator which e.g. co-operates with control means, e.g. limit switches, for the control of the rotational speed of the motor and consequently the movement of the sliding body inside the spiral 10. In FIG. 4b is shown an embodiment where the outer part 33b is provided with a guide wheel 35 which is rotatably journalled on the outer part 33b. The guide wheel has a concave peripheral limiting surface 36 whose dimensions are adapted to the design of the limiting surfaces of the slot 21d so that, in touch with at least some of them, it rolls in the slot during the movement of the sliding body in the longitudinal direction of the shaftless spiral.

FIGS. 4a and 4c show embodiments of the sliding body 30 where its projecting element 31 has an outer part 33a and 33c, respectively, particularly suitable to co-operate with a groove having a closed bottom. In the embodiment according to FIG. 4c the end of the outer part 33c is provided with a ball or a wheel 38 which, usually under spring loading, is rolled against the bottom of the groove when the sliding body is moved in the longitudinal direction of the casing. The embodiment is particularly suitable in applications where the sliding body is provided with three projecting elements 31, as shown in FIG. 5b and FIG. 5c. Through spring action possible dimensional deviations of the casing are absorbed.

In certain embodiments the projecting element 31 and/or the outer part 33 of the projecting element are resiliently retractable. In applications where the end of the outer part 33c is provided with a ball or wheel 38, the spring action just mentioned replaces or supplements the spring action which in the preceding paragraph was mentioned in connection with the ball or wheel 38.

Figure 4D:
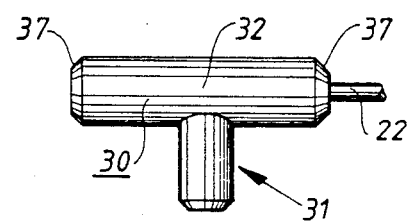

FIG. 4d shows an embodiment where the sliding body is designed so as to be moved in a driving device where the casing is missing altogether (FIG. 7) or where the casing 20 lacks slots (FIG. 5d). The projecting element 31 here is of a length which is less than the maximum distance between the limiting surface 13 of the spiral facing towards the geometrical center axis 14 and the outer limiting surface 15 of the spiral. The central part 32 is secured via the elongated element 22 against rotation, alternatively secured against rotating synchronously with the spiral 10. For this purpose, in some embodiments, the elongated element is connected in a torsionally rigid manner to the external means 60.

In FIGS. 5a–e are shown different embodiments of combinations of a sliding body 30 with projecting elements 31 in co-operation with the spiral 10. In FIG. 5a the slot 21d is designed as a through-slot in the wall 52 of the casing. The outer part 33a of the projecting element 31 here (see also FIG. 4a) is of a length such that the part projects outside the outer limiting surface 53 of the casing. In the Figure the driving device is shown in an embodiment where the casing 20 encloses the spiral with little play, as a result of which portions of the spiral are in contact with the casing and the spiral is supported (journalled) by the casing during its rotation. The embodiment illustrated in the Figure is particularly suitable, therefore, to be used in long driving devices and/or in applications where the spiral 10 is journalled only at its drive end. It will be obvious to those versed in the art that even if in FIG. 5a the sliding body 30 is shown with only one projecting element 31, the sliding body in some embodiments is provided with more than one projecting element, which are distributed in the circumferential direction of the central part 32 of the sliding body and displaced in its longitudinal direction corresponding to the pitch of the shaftless spiral. Matching this the casing 20 is provided of course with a corresponding number of slots 21.

In FIG. 5b is shown an embodiment where three slots 21a–c are provided in the inner limiting surface 27 of the casing 20 whilst FIG. 5c illustrates an embodiment, also with three slots 21a–c, where each is formed by two elevations 50a–50b arranged at a distance from one another, e.g. ledges or rims delimiting the slots.

In applications where the casing has more than one slot 21 and the sliding body 30 is provided with more than one projecting element 31 to co-operate with said slots and where the location of the slots is such that the angular separation between the slots measured in the circumferential direction of the casing varies in the longitudinal direction of the casing, the projecting elements are adapted to be rotatable in relation to one another in the circumferential direction of the central part 32 of the sliding body.

FIG. 5d illustrates an embodiment where the casing is wholly without slots. The element 31 projecting from the central part 32 of the sliding body is terminated by an outer part 33d whose distance to the center of the central part 32 is less than the distance from the geometrical centre axis of the shaftless spiral and the outer limiting surface 15 of the spiral.

In the embodiment illustrated in FIG. 5e the limiting element 59 is formed by the four bars 55a,b, 56,57. In the embodiments where the limiting elements is formed of only three bars and where the rotational movement of the sliding body is prevented by the outer part 33 of the projecting element 31, movement of the sliding body in the axial direction of the spiral at a change in the rotational direction of the spiral is delayed until the outer part 33 of the projecting element 31 through rotation of the spiral is moved from resting against one of the bars to resting against one of the two other bars.

Embodiments where the spiral 10 is journalled only next to its one end (drive end) have the advantage that the spiral owing to its weight and its elasticity transversely to the longitudinal direction of the spiral will in the lower part of the casing 20 be in touch with the lower limiting surface 27 of the same. On rotation, moreover, the spiral, especially if it is subject to the effect of a force (moment) via the sliding body, will be in touch, at least momentarily, with other parts of the casing, so that the spiral scrapes clean the inner limiting surface of the casing from contaminations which may penetrate into the casing cavity. Owing to the spiral being in touch with the lower part of the casing, contaminations will be transferred to anyone of the openings 25 of the casing on rotation of the spiral. It has been found in practice that the device according to the invention has a very long life.

Figure 6:
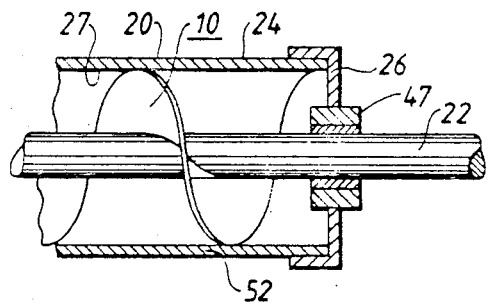
FIG. 6 shows a detail section of one end region of the driving device.

In FIG. 6 is shown especially how a bearing 47 for the elongated element 22 is provided in an end wall 26 of the casing. The bearing is designed so that it permits the elongated element 22 to be displaced in the longitudinal direction of the element and in certain embodiments also to rotate in the bearing. Due to the bearing 47 a stabilizing effect on the projecting element 22 is achieved, especially when it projects a relatively great distance from the end wall. In applications where the bearing 47 is used to secure the elongated element against rotation, or alternatively to prevent the elongated element from rotating synchronously with the spiral, there are no restrictions concerning rotational rigidity in the connection of the driver to the external means 60 or any demands on the capacity of the external means to resist the rotational movement.

Figure 8:
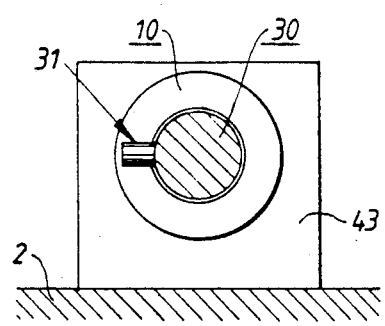
FIG. 8 is a section taken along line B—B in FIG. 7.

FIG. 7 and 8 show an embodiment of the invention particularly suitable for short travels using small forces. The driving device 1 is supported on a base 2 by means of a first upright plate 43 provided in the area of the first end region 11 of the spiral and a second upright plate 44 adjoining the second end region 12 of the spiral. The spiral 10 lacks an enclosing casing and its driving shaft 41 is mounted in a bearing 45 in the first upright plate. The elongated element 22 of the sliding body is movable in a bearing 46 in the second upright plate 44. What has been stated above in connection with FIGS. 4d and 6 concerning securing of the sliding body against rotational movement applies in appropriate parts also to this embodiment, that is to say the bearing 46 in the second upright plate 44 and/or the external means 60 are adapted to prevent or reduce such rotation. It will be obvious to those versed in the art that in some driving devices, especially those with short stroke lengths, the second upright plate 44 and also the bearing 46 are not required.

In the application of the invention the spiral 10 is rotated by the driving means (motor) 40, the projecting element 31, and with it the sliding body 30 being moved in the axial direction of the spiral in that the spiral, in contact with the projecting element and performing a relative movement in relation to the same, moves the projecting element in the axial direction of the spiral. This effect is obtained e.g. owing to the sliding body, via the connection to the external means 60 or through co-operation between the slot or the slots 21a–c, or alternatively the gap 21e and one or more outer parts 33a–c of the projecting element(s) 31, being prevented from accompanying the spiral in its rotational movement. The position of the elongated element 22 is thus determined by how much the spiral has rotated and in some applications also by the curvature of the slot or slots 21a–c. By variation of the rotational speed of the spiral, the pitch of the spiral and/or the curvature of the slot or slots the speed of movement of the sliding body and consequently that of the elongated element 22 is determined, and also to a certain extent the maximum force which the elongated element can exert on the means to which the driver 29 is connected. As a rule the dimensions of the part of the projecting element 31 which is in contact with the spiral are adapted to the pitch of the spiral, so that the extent of the projecting element in the longitudinal direction of the spiral will substantially coincide with the distance between two adjoining spiral turns 16a, 16b. In this way the occurrence of backlash (dead travel) in the movement of the projecting element, e.g. on change of the rotational direction of the spiral, is avoided.

As a rule the sliding body 30 is of an axial length which is sufficiently great for at least one turn of the spiral to enclose the cylindrical portion or portions 34 of the siding body. As a result the sliding body is assured the necessary axial orientation during movement in the axial direction of the spiral. The bevels 37 of the sliding body provided in some embodiments are particularly appropriate when the inner surface 13 of the spiral is not rounded.

In some embodiments the cylindrical portion or portions 34 of the sliding body 30 is/are allowed to have a diameter which substantially coincides with, but is slightly less than, the inside diameter of the spiral. In this way the required orientation and guiding of the axial direction of the sliding body is achieved even in applications where less than two turns of the spiral lie against the cylindrical portions.

The embodiments shown in FIGS. 5a–5d, with the slots provided on the inside of the casing 20 or where the casing has no slots, are particularly suitable e.g. for sanitary reasons where it is desired that surfaces should be as smooth as possible, e.g. in the food industry. By arranging the three slots with an angular separation in the circumferential direction of approx. 120° and letting the inside diameter of the spiral and the diameter of the central part 32 substantially agree, it is also made possible for the spiral, at least in the region of the sliding body, that is to say in the region where the spiral is subjected to the largest moment of force, to rotate without being in contact with the inner surface of the casing. This effect is particularly valuable in embodiments where ridges (ledges) arranged at a distance from one another form the slots.

In cases where the spiral during its rotation is in contact with the casing, the driving device in accordance with the invention is very insensitive to contaminations and fouling, since the spiral on its rotation scrapes clean the inside of the casing from all contaminations and removes them to the discharge openings 25 of the casing. During the movement of the sliding body 30 inside the spiral in its axial direction, the inside of the spiral is cleaned from contaminations and during the passage of the projecting element along the spiral turns these are freed from possible contaminations. The device therefore is fully self-cleaning and capable of working in specially dirty and unfavorable environments. It is also suitable when fully or partly immersed in liquid, since the presence of the latter has no negative effect whatever on the function of the driving.

It is also evident from the above description that in certain embodiments the casing mechanically stabilizes the shaftless spiral because the deformation of the spiral transversely to the longitudinal direction of the spiral is limited owing to contact with the inner limiting surface of the casing. The casing in turn, especially in the case of long driving devices, is mechanically stabilized by external means. The flexibility of the spiral transversely to its longitudinal direction is compensated by the mechanical strength of the casing which, where appropriate, is intensified by external mechanical stabilizing elements so that even in the case of great stroke lengths the driving device can be designed so that its weight will be low. The mechanical stability implies that it is feasible in certain applications to design the spiral with a large pitch giving rise to high speeds of movement at the same time as the driving device retains its low weight.

In some applications the projecting element 31 of the sliding body 30 and/or the outer part 33 of the projecting element is made resiliently retractable to provide through co-operation with flattening out grooves or slots that the projecting element after passing such slots during contact with the inner limiting surface of the casing, is rotated by the spiral in the circumferential direction of the casing to engage in an adjoining slot. As a result a rotation of the elongated element 22 with attached driver 29 is procured. In embodiments of the device where the projecting element or its extension co-operates with a slot 21a,b a special guiding means (not shown in the figures) is provided in order to move the projecting element and/or its extension in the radial direction of the casing to the position or positions wherein the external part of the element or its extension can pass in over the inner limiting surface of the casing. The guiding means is constituted e.g. of a ledge or plate which is connected to the outer limiting surface 53 of the casing at an oblique angle. In the region of connection the slot passes into a groove flattening out towards the inner limiting surface 27 of the casing.

In some embodiments of the invention the spiral 10 is coupled to a driving element in a region between the first end region 23 and the second end region 24. Between the engaging or coupling region of the driving element and the respective end region the spiral surrounds at least one sliding body 30a, b. Through selection of e.g. the pitch of the respective spiral part and "blade direction" it becomes possible to determine the direction of movement, the speed of movement and/or the length of stroke of the respective sliding body. The drivers connected to the respective sliding body as a result thereof will describe courses of movement which are different from one another.

As is evident from the above description, the invention provides a particularly compact, simple and sturdy construction of a driving device comprising one or more drivers movable in predetermined paths. The device which in some applications forms a completely closed system, is well protected against external influence and provides the possibility of a simple variation of the speed of movement of the respective driver and can be controlled by simple automatics e.g. limit switches or a phase inverter of an electric driving motor, etc. In applications where the slot or slots are curve-shaped a rotational movement of the driver is also achieved during the axial movement of the driver provided on the elongated element 22.

The above detailed description referred only to a limited number of embodiments of the invention, but it will be readily obvious to those versed in the art that the invention encompasses a large number of embodiments within the scope of the following claims.

What is claimed is:

1. A driving device for producing substantially linear movement of a driver, said driver device comprising a shaftless spiral rotatable around a longitudinal axis and having opposite first and second end regions each corresponding to an end of the spiral, said shaftless spiral comprising a flat element spirally wound around said longitudinal axis and defining a succession of radial turns having a determined pitch and defining inner and outer limiting surfaces, a sliding body supported in enclosed relation within the inner limiting surface of said shaftless spiral with capability of axial movement relative to said spiral, a projecting element on said sliding body extending between two adjoining turns of said spiral with little axial play, means co-operating with said sliding body to limit rotational movement thereof during rotation of the spiral, said sliding body comprising an elongated portion extending in the axial direction of the spiral and on which the inner limiting surface of said spiral is fitted with little radial play, said elongated element constituting a driver which upon rotation of the spiral is moved substantially in the direction of the longitudinal axis of the shaftless spiral.

2. A device as claimed in claim 1 wherein said means which limits rotational movement of the sliding body is located externally of the spiral and is coupled to said driver to be moved thereby.

3. A device as claimed in claim 1 wherein said sliding body is connected in a substantially torsionally rigid manner to the means which limits rotation of the sliding body.

4. A device as claimed in claim 1 wherein said means which limits rotation of said sliding body comprises an elongated casing of substantially circular inner cross-section surrounding said outer limiting surface of said spiral, said casing having a slot which extends from a first end region to a second end region each corresponding to an end of the casing, said slot co-operating with said projecting element to limit rotation of said sliding body.

5. A device as claimed in claim 4 wherein said projecting element is engaged in said slot.

6. A device as claimed in claim 4 wherein said projecting element includes an extension engaged in said slot.

7. A device as claimed in claim 4 wherein said slot is formed by two spaced elevations on an inner surface of the casing.

8. A device as claimed in claim 4 wherein said casing includes a wall in which said slot is formed.

9. A device as claimed in claim 1 wherein said means for limiting rotation of said sliding body comprises a pair of spaced longitudinal bars arranged outside said outer limiting surface of said spiral and coacting with said projecting element to limit rotation of the sliding body.

10. A device as claimed in claim 9 comprising at least one additional longitudinal bar in peripheral contact with the spiral.

11. A device as claimed in claim 9 comprising an extension on said projecting element engaged between said pair of spaced longitudinal bars.

12. A device as claimed in claim 6 or 9 comprising an outer part on said extension extending beyond said slot.

13. A device as claimed in claim 1 wherein said sliding body includes a cylindrical portion, said inner limiting surface of said spiral engaging said cylindrical portion to support and orient said sliding body.

14. A device as claimed in claim 1 wherein in the region of the spiral turns said projecting element has an extent in the longitudinal direction of said sliding body which corresponds substantially to the spacing between two adjoining turns of said spiral so as to pass with little play between the turns of the spiral.

15. A device as claimed in claim 1 comprising driving means for driving said spiral in rotation.

* * * * *